July 3, 1934.    R. PATCHEN    1,965,469
GREEN CORN SHELLER
Filed May 26, 1932
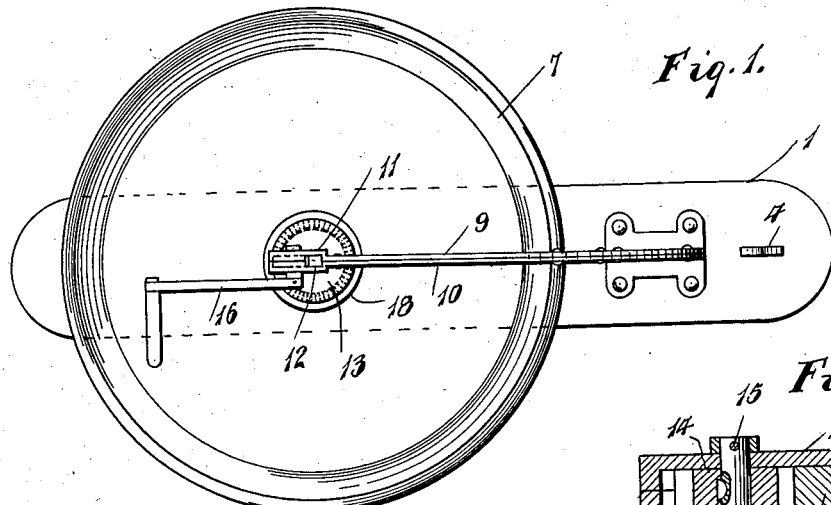
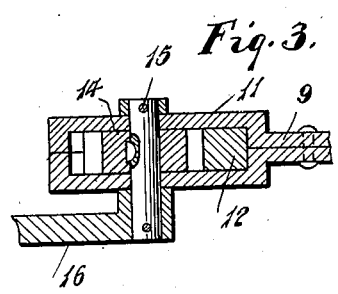
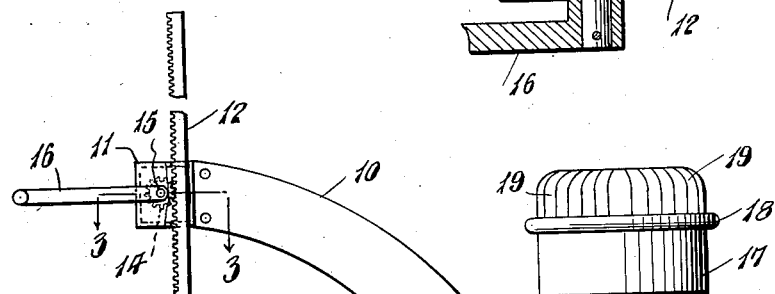
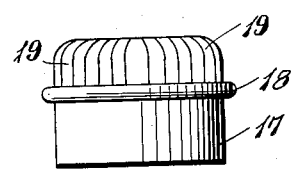
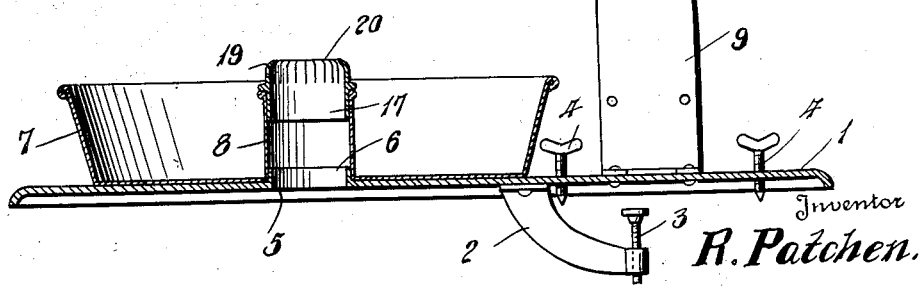

Patented July 3, 1934

1,965,469

UNITED STATES PATENT OFFICE 1,965,469

GREEN CORN SHELLER

Robert Patchen, McLaughlin, S. Dak.

Application May 26, 1932, Serial No. 613,722

5 Claims. (Cl. 146—4)

The invention relates to devices for cutting the grains from ears of corn, and has for its object the provision of a machine of the type referred to that will effectively remove the grains from the corn cob while being formed through a cutting element and depositing the grains in a receptacle provided for the purpose.

A further object of the invention is the provision of a corn sheller that is reasonable in cost of manufacture, is extremely durable in construction and will effectually remove the grains of corn from the cob.

A further object of the invention is the provision of an improved construction of cutting means for separating the grains of corn from a corn cob including an annular cutting element adapted to support the ear of corn and to permit the cob to pass therethrough while the strips are being stripped therefrom, the cutting element having a plurality of cutting blades with their cutting edges extending inwardly of the elements.

The invention will be described in detail hereinafter and will be found illustrated in the accompanying drawing, in which Figure 1 is a top plan view of the improved green corn sheller.

Figure 2 is a side view partly in section.

Figure 3 is a sectional detail on a plane indicated by the line 3—3 of Figure 2, and Figure 4 is a side view of one of the cutting elements.

In the drawing similar reference characters are used to designate corresponding parts in all of the views.

The improved green corn sheller includes a base member 1 having a clamping arm 2 secured to its under side and provided with a threaded clamping member 3 that is adapted to hold the base member in a fixed position on a suitable horizontal support, such for instance as a fixed table and also provided with threaded and pointed securing members 4. The base member 1 has an opening 5 through which the corn cob will be discharged when the device is in operation, said opening being defined by an upstanding annular flange 6. 7 designates a receptacle to receive the shelled corn and having an opening in its bottom with an upright tubular flange 8 defining the opening and adapted to seat over the flange 6 as best shown in Figure 2.

Also secured to the base 1 is an upright standard 9 having its upper portion curved over the receptacle 7 as shown at 10 and provided with a bearing member 11 in which is slidably mounted a rack bar 12 having a flanged plunger 13 secured to its lower end to engage the top of the ear of corn. The rack bar 12 and plunger 13 are actuated by means of a pinion 14 keyed to a shaft 15, and 16 indicates a crank arm also secured to the shaft 15 for actuating the shaft and the pinion 14, or it will be apparent that any other means of rotating the shaft 15 may be substituted, as for instance the shaft may be geared to a motor shaft (not shown).

The means for stripping the grains from the cob, and for supporting the ear of corn during the shelling operation, is a cutting element in the form of an annulus or ring designated 17, and having a circumferential flange 18 to seat on the top of the tubular flange 8. The upper portion of the annular cutting element is formed of a plurality of cutting blades 19 formed by parallel incisions longitudinally of the ring, the upper cutting edges of said blades being turned inwardly of the annular cutting element as shown at 20, thus providing a clearance for the movement of the cob through the cutting element and the flanged opening 5 in the base, and furthermore providing means for more effectually removing the grains from the cob.

In practice it will be found that several different sizes of cutting elements will be necessary to provide for different sizes of grains of corn and cobs.

In using the device it will be apparent that the ear of corn is supported on the cutting element preliminary to removing the grains therefrom and the plunger 13 on being engaged therewith at the top and moved downwardly by rotation of the shaft 15 will push the cob through the cutting element and during its passage the grains will be cut from the cob and will fall into the receptacle 7.

What is claimed is:—

1. A green corn sheller, comprising a base having a flanged opening therein, a receptacle seated on the base, a tubular member in said receptacle and engaged by the opening flange, an annular cutting element having a flange seated on the tubular member, an upright support mounted on the base, a plunger slidably mounted on said support, and means to actuate the plunger.

2. A green corn sheller, comprising a base having an opening therein, an upstanding flange enclosing said opening, a receptacle having an opening in its bottom adapted to receive said flange, an upstanding tubular flange enclosing the opening in the receptacle bottom, said openings being adapted for discharge of corn cobs therethrough, an annular cutting element, a circumferential flange on said element adapted to seat on said tubular flange, said cutting element adapted to support an ear of corn for shelling, an upright support mounted on the base, a plunger adapted to engage the ear of corn, a rack bar secured to the plunger and slidably mounted on the support, and a pinion meshing with said rack bar and operable to actuate the plunger.

3. A green corn sheller, comprising a receptacle to receive shelled corn, and having an opening in its bottom for discharge of a corn cob, a tubular flange surrounding said opening, an annular cutting element, a circumferential flange on said element to seat on said tubular flange, a plunger slidably mounted on a suitable support, a rack bar on said plunger, and a pinion meshing with said rack bar and operable to actuate the plunger, the cutting element adapted to support an ear of corn and engageable by said plunger to force the cob through the element and strip the grains therefrom during its passage.

4. In a green corn sheller, a cutting element comprising an uninterrupted ring of thin metal having a circumferential flange to seat on a tubular support, said element including a plurality of cutting blades on one end of the ring, and each of said blades bent inwardly of the ring adjacent to the cutting edge thereof.

5. In a green corn sheller, a cutting element comprising an uninterrupted ring of thin metal having a circumferential flange to seat on a tubular support, said element including a plurality of cutting blades integral with said ring and bent inwardly of the ring adjacent to their cutting edges.

ROBERT PATCHEN.